United States Patent [19]
Morinigo et al.

[11] Patent Number: 5,350,153
[45] Date of Patent: Sep. 27, 1994

[54] CORE DESIGN FOR ELECTROMAGNETICALLY ACTUATED VALVE

[75] Inventors: Fernando B. Morinigo, Los Angeles; William C. Blaire, Buena Park; Dennis Bulgatz, Reseda, all of Calif.

[73] Assignee: Aura Systems, Inc., El Segundo, Calif.

[21] Appl. No.: 84,814

[22] Filed: Jun. 28, 1993

Related U.S. Application Data

[63] Continuation-in-part of Ser. No. 957,194, Oct. 5, 1992, Pat. No. 5,222,714.

[51] Int. Cl.⁵ ............................................. F16K 31/06
[52] U.S. Cl. ........................ 251/129.16; 251/129.15; 251/368; 251/129.1
[58] Field of Search ................ 251/129.16, 129.15, 251/368, 129.1

[56] References Cited

U.S. PATENT DOCUMENTS

| | | | |
|---|---|---|---|
| 4,175,330 | 12/1977 | Buchl | 123/251 |
| 4,474,332 | 10/1984 | Kaska | 251/129.14 X |
| 4,614,170 | 9/1986 | Pischinger et al. | 123/251 |
| 4,655,396 | 4/1987 | Taxon et al. | 251/129.16 X |
| 4,719,882 | 1/1988 | Kreuter | 123/251 |
| 4,830,286 | 5/1989 | Asslaender et al. | 251/129.16 X |
| 4,951,878 | 8/1990 | Casey et al. | 251/129.15 X |
| 5,048,564 | 9/1991 | Gaiardo | 251/129.16 X |
| 5,054,691 | 10/1991 | Huang et al. | 251/129.16 X |
| 5,131,624 | 7/1992 | Kreuter et al. | 251/129.16 X |

Primary Examiner—Arnold Rosenthal
Attorney, Agent, or Firm—Lisa A. Clifford; Anthony T. Cascio

[57] ABSTRACT

An improved electromagnetically actuated valve is disclosed. The improved valve design includes a layer of structurally stable, non-magnetic material, preferably Kapton or Chrome, disposed intermediate the core element and the electromagnetic element of the valve, and a core element and electromagnetic element fabricated from a high electrical resistive iron material. The layer of non-magnetic structurally stable material and high resistance core element serve to eliminate the hysteresis effect in the magnetic force of the valve. The core element may also include radially extending or axially extending perforations through the core element. The axial and radial perforations serve to reduce the weight of the core design and the axial perforations serve to reduce the effect of the air spring created in the gap as the core element approaches the electromagnetic element during operation of the valve.

16 Claims, 2 Drawing Sheets

CORE DESIGN FOR ELECTROMAGNETICALLY ACTUATED VALVE

RELATED APPLICATION DATA

The present application is a continuation-in-part of commonly owned, co-pending application U.S. Ser. No. 07/957,194, filed on Oct. 5, 1992, now U.S. Pat. No. 5,222,714, dated Jun. 29, 1993 for Electromagnetically Actuated Valve, which is incorporated by reference herein.

FIELD OF THE INVENTION

The present invention relates generally to an electromagnetically actuated valve, and more particularly to an improved core design for an electromagnetically actuated valve.

BACKGROUND OF THE INVENTION

In the past, valves have been designed for opening and closing mechanisms that combine the action of springs with electromagnets. However, the earlier designs did not operate quickly enough to open and close the valves with sufficient speed. For example, valves using spring action could not be designed with the speed normally required for the opening and closing of an internal combustion engine's intake and exhaust valves, or for the speed required for air compressors.

One of the reasons why the earlier valve designs could not operate at the desired high speeds is the mass of the moving core assembly. In previous designs, the mass of the moving core piece providing the return path for the magnetic flux was not sufficiently small so that it could be accelerated as quickly as desired for certain applications, such as modern internal combustion engines. Therefore, a need existed for a lightweight core design for use in an electromagnetically actuated valve.

Another problem with the valves of the prior art is caused by hysteresis, or a lagging in the value of magnetization in a magnetic material due to a change in magnetizing forces. More specifically, in the previously designed electromagnetic actuators, eddy currents and a residual flux remain in the magnetic material when the electromagnet in the valve is deenergized, causing a delay in the release of the core and therefore a decrease in the speed of the valve. Therefore, it is desirable to eliminate the residual flux, and thereby instantaneously decay the magnetic forces to zero such that the actuator reacts quicker.

SUMMARY OF THE INVENTION

Accordingly, it is a primary object of the present invention to overcome one or more disadvantages and limitations of the prior art.

Another object of the present invention is to provide electromagnetic actuator having a sufficiently small moving core mass to allow valve operation at higher speeds and higher frequency than the prior art.

Still another object of the present invention is to provide electromagnetic actuator that reduces the hysteresis effect on the actuator magnetic forces.

According to a broad aspect of the present invention, the design of the core element of the electromagnetic actuator is improved. The electromagnetically actuated valve includes at least one electromagnetic assembly having an electromagnetic element and a coil disposed within the electromagnetic element, and at least one core element defining a central axis and being biased in an initial spaced apart relationship from the electromagnetic elements. The improvement comprises a layer of structurally stable, nonmagnetic material disposed intermediate the electromagnetic elements and the core element. Another aspect of the invention is that the core element defines at least one aperture offset from the central axis. In the embodiment shown, the core element includes both radially and axially oriented apertures.

These and other objects, advantages and features of the present invention will become readily apparent to those skilled in the art from a study of the following description of an exemplary preferred embodiment when read in conjunction with the attached drawing and appended claims.

DESCRIPTION OF AN EXEMPLARY PREFERRED EMBODIMENT

Figure 1:
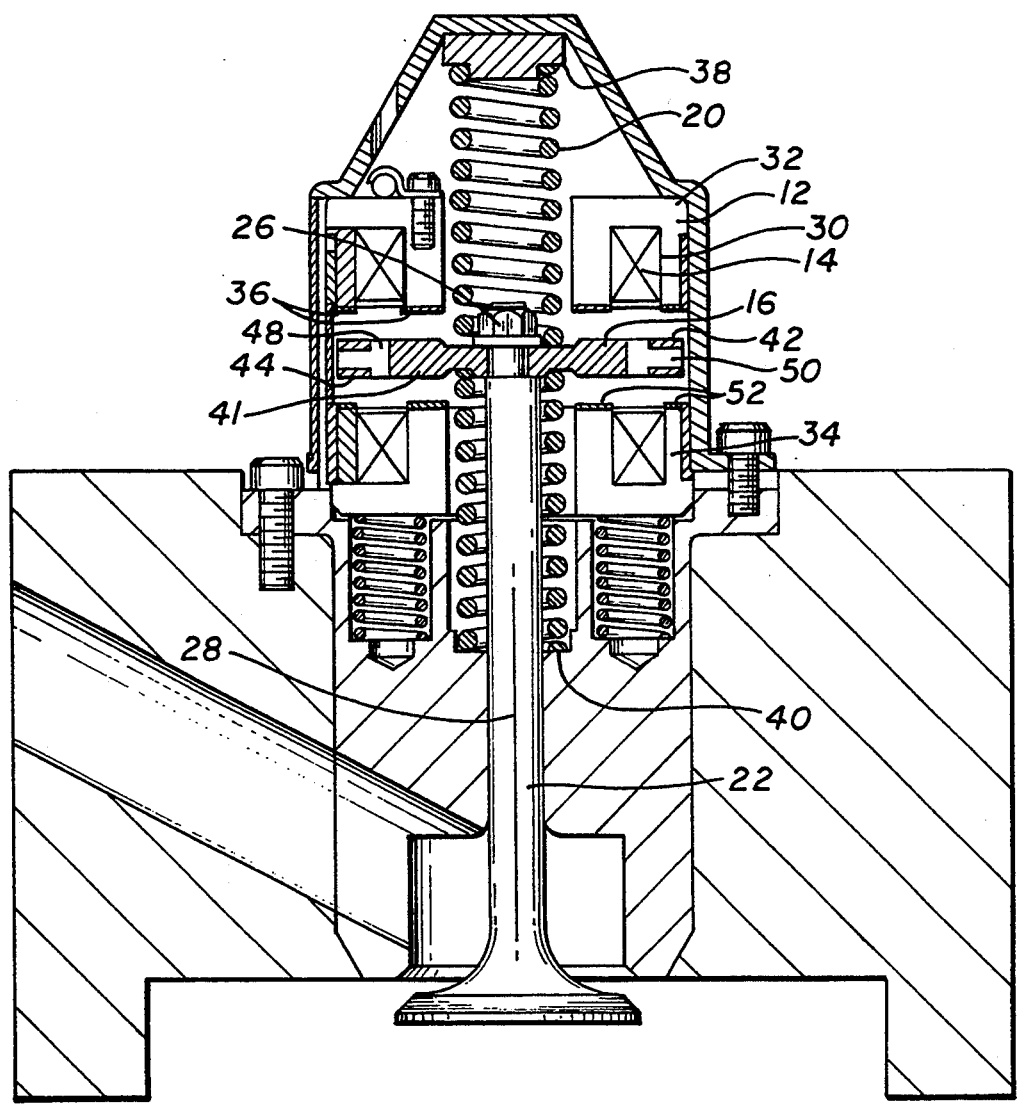
FIG. 1 is a cross-sectional view of one embodiment of the electromagnetically actuated valve showing the apertures of the improved core design and the layer of non-magnetic material of the present invention.

Referring now to FIG. 1, one embodiment of a valve 10 of the present invention is shown in cross-section. In the embodiment shown, the valve 10 includes two pairs of electromagnetic elements 12, a plurality of coils 14, a core element 16, a support spring 20, a valve stem 22, and a valve case 24. Each of the electromagnetic elements 12 preferably have an annular shape. The annular shape of the electromagnetic elements 12 defines a central chamber 26 through which the valve stem 22 extends. The central chamber 26 further defines a central vertical axis 28 of the core element 16.

The electromagnetic elements 12 each define two open faces 44, which lead into a central channel 30 within the electromagnetic elements 12. The open faces 44 provide an electromagnetic pole face area. The coil elements 14 extend within the channel 30 of the electromagnetic elements.

Each pair of electromagnetic elements 12 further comprises an upper electromagnetic element 32 and a lower electromagnetic element 34. The upper and lower electromagnetic elements are in a mirrored relationship to each other, with the central channels 30 of the upper and lower electromagnetic elements being in a facing relationship to each other.

Disposed intermediate the upper and lower electromagnetic elements 32, 34 is the core element 16. The core element 16 provides a pole face area 41. In the embodiment shown, the core element 16 is secured to the valve stem 22, preferably at the center of the core element 16. The valve stem 22 preferably extends in axial alignment with the central vertical axis 28 of the central chamber 26

The support spring 20 is also disposed within the central chamber 26, preferably surrounding the valve stem 22. The valve is enclosed by the valve case 24, which defines an upper portion 38 and a lower portion 40 that the support spring 20 contacts.

Figure 2:
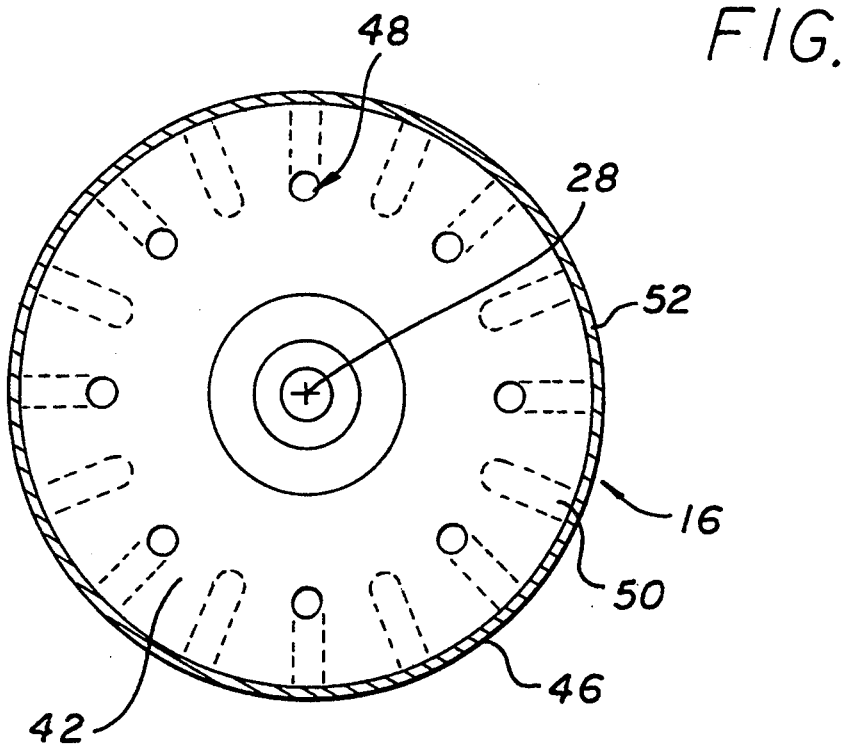
FIG. 2 is a top view of the improved core design of the electromagnetically actuated valve of the present invention.
Figure 3:
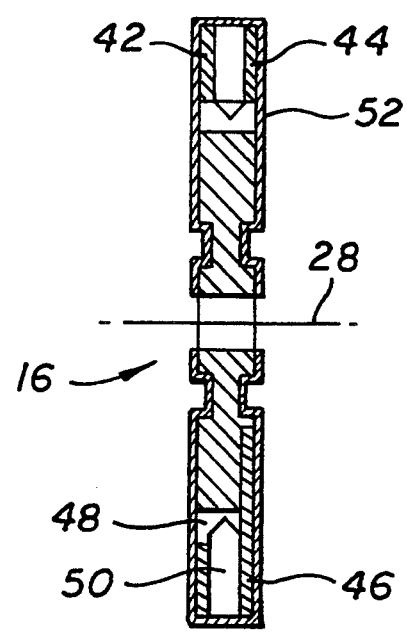
FIG. 3 is a side view of the improved core design of the electromagnetically actuated valve of the present invention.

Referring now to FIGS. 1, 2 and 3, the advantages of the unique core design of the present invention are discussed. As shown in FIG. 1, the core element 16 may include an upper surface 42, a lower surface 44 and an outer edge surface 46 connecting the upper and lower surfaces. The core element 16 includes a plurality of axially extending apertures 48 which extend from the upper surface 42 to the lower surface 44 of the core element 16. In the embodiment shown in FIGS. 2 and 3, eight axially extending apertures 48 are disposed equidistant around the circumference of the core element 16. Each of the axially extending apertures 48 are disposed approximately one-quarter of an inch from the outer cage of the core element 16.

The axially extending apertures 48 serve two purposes. The first purpose is to reduce the mass of the core element 16, while still providing a sufficient flux path area. Therefore, the axially-oriented apertures 48 allow for faster operation of the valve. The second purpose of the axially-extending aperture 48 is to allow air to pass through the core element 16 as the core element approaches the electromagnetic elements 32,34. This, in turn, reduces the air spring effect created between the core element and the electromagnetic elements during operation of the valve.

The core element 16 further includes sixteen radially extending apertures 50 arranged equidistant around the circumference of the core element 16. The radially extending apertures 50 preferably extend from the outer edge surface 46 approximately one-quarter of an inch towards the central axis 28. The radially extending apertures also serve to reduce the mass of the core element.

It should be noted that the described quantity, dimensions, and locations of the apertures 48, 50 used in the preferred embodiment are exemplary only, and that a different quantity, dimension and location of apertures could be used for this invention. It is also noted that the shape of the care element is exemplary only. For example, the care element, disclosed in U.S. patent application No. 07/957,194, filed on Oct. 5, 1992 and assigned to the assignees herein, may be designed with apertures which extend through the core element at an anglo from the central vertical axis of the core element.

Referring now to FIG. 1, another feature of the present invention is shown. As shown in FIG. 1, the actuator includes a thin layer 52 of non-magnetic, structurally stable material disposed intermediate the electromagnetic elements 32, 34 and the core element 16. The thin layer 52 is preferably comprised of Kapton or Chrome. The layer 52 of material is preferably approximately 2–3 thousandths of an inch in thickness. In FIG. 1, the layer 52 is shown as coated on the pole face areas of the electromagnetic elements 32, 34, such that the coating is intermediate the electromagnetic element and the core element when the valve is closed. Referring now to FIGS. 2 and 3, the layer 52 of nonmagnetic material may also be coated directly onto the core element 16. The coating of the non-magnetic material onto the core element also allows the layer 52 of material to be disposed intermediate the electromagnetic element an the core element when the valve is closed.

The function of the layer 52 of non-magnetic material is to reduce the inductance at the smallest gap. More specifically, when the valve is closed, and the electromagnetic element contacts the core element, a closed flux path is created between the electromagnetic element and the core element. However, when the current is turned off, eddy currents develop to oppose change in the field. Therefore, the magnetic field does not immediately decay to zero, and flux continues to exist and create force. Therefore, the magnetization value in the valve undergoes a lagging effect in the magnetization force applied to the valve.

In order to eliminate the eddy currents when the electromagnet is deenergized, it is necessary to minimize the value of decay time in the magnetic field. In the present invention, this is accomplished by reducing the inductance at the smallest gap and increasing the resistance of the material in the core element. More specifically, the inductance is decreased by disposing the layer 52 of non-magnetic, structurally stable material intermediate the core element and the electromagnetic element. The layer 52 is preferably a thin layer so as to not significantly effect the output of the valve. The layer 52 creates a gap between the electromagnet and core element which decreases the inductance of the magnetic field.

To further reduce the decay time, it is desirable to increase the electrical resistivity of the core element and electromagnetic element material. In the preferred embodiment of the present invention, a high electrical resistivity iron is used to fabricate the core element and electromagnetic element. By way of example, silicon iron may be used for the core element and electromagnetic element. Therefore, in operation, when the electromagnet is deenergized, the low inductance of the gap created by the layer 52 and the high electrical resistivity of the core element and electromagnetic element material will expedite the decay of the magnetic forces to zero, allowing the actuator to react quicker.

Referring back to FIG. 1, the operation of the valve 10 will be described. It is to be noted that in this context, the core assembly 16 includes the core and the assembly connected to the core for each particular application. In its neutral, unpowered state, the spring 20 hold the core 16 halfway between the upper and lower electromagnets 32, 34, in the equilibrium position. In order for the valve 10 to change from the neutral position to the closed position, a high current short duration pulse is applied to coil 14a, creating an electromagnetic force that attracts the core 16 to the upper electromagnet 32. The electromagnetic force overcomes the forces of the spring 20 and therefore drives the valve 10 to its closed position. Once the valve 10 is in its closed position, only a small steady current in the coil 14a is necessary to maintain the valve 10 in its closed position.

The core 16 remains in the closed position as long as the attractive force between the core 16 and the electromagnet 32 is greater than the force with which the spring 20 tries to restore the core 16 the its neutral position. In order to open the valve 10, the current flowing through the coil 14a is interrupted. When the current is interrupted, the spring 20 drives the core assembly 16 back toward the neutral position, gaining speed as its approaches the neutral position. The net force of the spring 20 on the core assembly 16 is is zero at the neutral position, however, by Newton's law of motion, at maximum velocity. The velocity, therefore, carries the core assembly 16 past the neutral position. Once the core assembly 16 is past the neutral position, the spring 20 exerts forces on the core assembly 16 opposing the velocity, which decelerates the core assembly 16 as it approaches the lower electromagnet 34.

In the case of very small friction, the moving core assembly 16 will move past the neutral position to a distance from the neutral position approximately equal to the distance from the neutral position from which it started on the opposite side. As the core assembly 16 approaches the lower electromagnet 34, a relatively small current in the coil 14b is sufficient to provide a force to compensate for energy lost due to the mechanical friction and spring damping and to add the energy required to overcome the pressure differential across the valve. The current in coil 14b is also sufficient to hold the valve in the open position.

When the valve 10 is in its operational powered state, the energy required to drive the valve 10 from the open position to the closed position, or vice versa, is furnished almost entirely by the energy stored in the compressed support spring 20. A small amount of energy lost to friction is provided by the attraction of the core assembly 16 to the lower electromagnet 34, which begins as soon as the current is turned on in the coil 14b. Thus, preferably the coil 14b is turned on early in the valve opening sequence, closely following the interruption of the current in the coil 14a.

It should be noted that it is also possible to utilize the valve of the present invention in order to actuate an external load. In this embodiment of the invention, the valve stem is comprised of an actuator rod, which is connected to the external device. The upper and lower electromagnetic elements are then energized sequentially at a resonant frequency, in order to resonate the spring mass system. Therefore, the actuator actuates the external load, while maintaining a low current requirement.

There has been described hereinabove an exemplary preferred embodiment of the electromagnetically actuated valve according to the principles of the present invention. Those skilled in the art may now make numerous uses of, and departures from, the abovedescribed embodiments without departing from the inventive concepts disclosed herein. Accordingly, the present invention is to be defined solely by the scope of the following claims.

We claim as our invention:

1. In an electromagnetically actuated valve having at least one electromagnetic assembly including an electromagnetic element and a coil disposed within the electromagnetic element, and at least one core element defining an upper surface, a lower surface, an outer edge surface and a central axis and being biased in an initial spaced apart relationship from the electromagnetic element, an improvement comprising:
   a layer of structurally stable, non-magnetic material disposed intermediate the electromagnetic element and the core element; and,
   at least one radial aperture extending radially at least partially through the core element intermediate the upper surface and the lower surface.

2. An electromagnetically actuated valve in accordance with claim 1 wherein said layer of structurally stable, non-magnetic material is coated onto the core element.

3. An electromagnetically actuated valve in accordance with claim 1 wherein said layer of structurally stable, non-magnetic material is coated onto a portion of the electromagnetic element.

4. An electromagnetically actuated valve in accordance with claim 1 wherein said layer of material is comprised of Kapton.

5. An electromagnetically actuated valve in accordance with claim 1 wherein said a layer of material is comprised of Chrome.

6. An electromagnetically actuated valve in accordance with claim 1 wherein said layer of structurally stable non-magnetic material is approximately 2–3 thousandths of an inch in thickness.

7. An electromagnetically actuated valve in accordance with claim 1 wherein the improvement further comprises the core element and electromagnetic element being fabricated from a high electrical resistivity material.

8. An electromagnetically actuated valve in accordance with claim 7 wherein the high resistivity material is silicon iron.

9. An electromagnetically actuated valve in accordance with claim 1 wherein the improvement further comprises the core element defining at least one non-radially oriented aperture, said non-radially oriented aperture being offset from the central axis of the core element.

10. An electromagnetically actuated valve in accordance with claim 9 wherein the diameter of said aperture is approximately one-eighth of an inch.

11. In an electromagnetically actuated valve having an electromagnetic element, a coil disposed within the electromagnetic element, and an annular-shaped core element having an upper surface, a lower surface and an outer edge surface, and defining a central axis, and being biased in a normally spaced apart relationship from the electromagnet, an improvement comprising:
   said core element defining at least one radial aperture extending radially at least partially through the core element intermediate the upper surface and the lower surface.

12. An electromagnetically actuated valve in accordance with claim 11 wherein said radial aperture begins at the outer edge surface of the core element.

13. An electromagnetically actuated valve in accordance with claim 12 wherein said radial aperture extends approximately five-sixteenths of an inch toward the central axis from the outer edge surface of the core element.

14. An electromagnetically actuated valve in accordance with claim 11 wherein the diameter of said radial aperture is approximately one-eighth of an inch.

15. An electromagnetically actuated valve in accordance with claim 11 wherein said core element further defines at least one axially oriented aperture, said axially oriented aperture being offset from the central axis.

16. An electromagnetically actuated valve in accordance with claim 15 wherein the diameter of said axially oriented aperture is approximately one-eighth of an inch.

* * * * *